United States Patent
Kwon et al.

(10) Patent No.: US 9,559,794 B2
(45) Date of Patent: Jan. 31, 2017

(54) APPARATUS AND METHOD FOR DETECTING SIGNALS

(71) Applicant: ELECTRONICS AND TELECOMMUNICATIONS RESEARCH INSTITUTE, Daejeon (KR)

(72) Inventors: Young-Hyoun Kwon, Daejeon (KR); Kyung-Hoon Lee, Daejeon (KR); Hui-Rae Cho, Daejeon (KR); Jae-Ki Lee, Daegu (KR); Hee-Sun Park, Daejeon (KR); Jin-Gak Jang, Daejeon (KR); Jin-Hyun Kim, Seoul (KR); Ji-Eun Kim, Daejeon (KR); In-Ho Hwang, Daejeon (KR); Chun-Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 584 days.

(21) Appl. No.: 14/064,163

(22) Filed: Oct. 27, 2013

(65) Prior Publication Data
US 2014/0152811 A1  Jun. 5, 2014

(30) Foreign Application Priority Data
Nov. 30, 2012 (KR) .......... 10-2012-0138411

(51) Int. Cl.
*H04B 17/00* (2015.01)
*H04B 17/309* (2015.01)
*H04B 17/23* (2015.01)

(52) U.S. Cl.
CPC ............. *H04B 17/309* (2015.01); *H04B 17/23* (2015.01)

(58) Field of Classification Search
CPC .............................. H04B 17/23; H04B 17/309
See application file for complete search history.

(56) References Cited

U.S. PATENT DOCUMENTS

| | | | |
|---|---|---|---|
| 6,362,749 B1 * | 3/2002 | Brill | G08G 1/0965 174/36 |
| 6,865,394 B2 * | 3/2005 | Ogino | G01S 5/14 340/988 |
| 7,647,061 B1 * | 1/2010 | Steer | H04W 24/00 455/446 |
| 8,050,413 B2 | 11/2011 | Stephanson | |
| 8,175,539 B2 | 5/2012 | Diener et al. | |
| 2002/0132625 A1 | 9/2002 | Ogino et al. | |

(Continued)

FOREIGN PATENT DOCUMENTS

JP  2005-098958 A  4/2005
KR  10-2002-0064153 A  8/2002

*Primary Examiner* — Kenneth Lam
(74) *Attorney, Agent, or Firm* — LRK Patent Law Firm

(57) ABSTRACT

A signal detection apparatus includes a signal reception unit, an Analog to Digital (A/D) signal processing unit, and a user interface unit. The signal reception unit receives an external signal. The A/D signal processing unit determines whether the received signal is an abnormal signal based on a plurality of signal profiles having different signal characteristics, and obtains the abnormal signal if, as a result of the determination, it is determined that the received signal is the abnormal signal. The user interface unit displays the abnormal signal.

16 Claims, 4 Drawing Sheets

(56) References Cited

U.S. PATENT DOCUMENTS

| | | | |
|---|---|---|---|
| 2003/0123420 A1 | 7/2003 | Sherlock | |
| 2007/0194923 A1* | 8/2007 | Karr | G01S 3/52 340/572.1 |
| 2010/0231398 A1* | 9/2010 | Engholm | G01R 23/16 340/658 |
| 2011/0267222 A1* | 11/2011 | Craig | G01S 13/878 342/25 B |

* cited by examiner

APPARATUS AND METHOD FOR DETECTING SIGNALS

CROSS REFERENCE TO RELATED APPLICATION

This application claims the benefit, of Korean Patent Application No. 10-2012-0108411, filed on Nov. 30, 2012, which is hereby incorporated by reference in its entirety into this application.

BACKGROUND OF THE INVENTION

1. Technical Field

The present invention relates generally to an apparatus and method for detecting signals and, more particularly, to an apparatus and method for detecting signals that process a received wired or wireless signal in accordance with a predetermined condition so that the characteristics of the signal and information about the arrival direction, location, and type of the signal can be determined.

2. Description of the Related Art

With the development of information and communication technology, information based on information and communication technology is frequently transferred and obtained in private, government, or military organizations. Furthermore, the demand for the blocking of information and communication technology equipment used for obtaining such information is also increasing in response thereto.

In particular, these days, persons or anti-governmental organizations often attempt to collect or attack specific information using illegal equipment. This leads to the divulgence of information, and may damage a physically established public infrastructure. If a signal is distorted or a disrupting signal is generated in a smart grid, a public transportation network or an information collection detector, serious physical damage may occur, or there may arise a problem that adversely impacts upon the normal functioning of society. In general, a signal detector is used as a piece of equipment for efficiently detecting and tracking such an abnormal signal.

Technology for a signal detector basically includes a signal detection technique capable of determining whether a signal is present, an analysis technique capable of determining whether a signal is illegal, and a direction detection technique capable of estimating the location of a signal. In general, in the signal detection technique, a signal is detected when the output of the signal is higher than a specific signal level in the frequency domain. The simplest method of determining whether the detected signal is an illegal signal is to determine whether the detected signal is used at a permitted frequency in a permitted signal form. In another method, a user checks all signals, prepares a list of the signals, maintains the list, and determines that a signal not included in the list is an abnormal signal when the signal not included in the list is generated during a future operation.

Furthermore, a directional antenna is commonly used to track the location of a signal source related to a detected abnormal signal. The directional antenna displays the intensity of a signal, or converts the signal into sound that can be heard by a user and outputs the converted signal, and the user detects a signal source using a direction detection antenna. In order to precisely detect the direction of a signal, a method of deploying an antenna in a remote place, unlike a method using a portable direction detection antenna, analyzing the magnitude and phase of a signal received at each location using the antenna, and estimating the direction and location of the signal based on the magnitude and phase has also been developed.

Various types of conventional signal detection equipment do not include a function for analyzing a signal itself in a detailed manner, and thus require a user to perform various tasks. For example, when the conventional signal detection equipment analyzes the characteristics of a detected signal and notifies a user of the type of transmitter that sent the detected signal and the place from which the detected signal was sent, the user has to perform various tasks (i.e., estimating a signal modulation scheme, estimating a communication protocol, decrypting a digital password, and detecting a direction) or collect or classify information based on an external special device. In this approach, signals have to be allowed until a user finishes analyzing a specific signal, and it takes a long time to take countermeasures.

As a conventional art, U.S. Pat. No. 8,175,539 discloses a system and method for managing a shared frequency band. The technology disclosed in U.S. Pat. No. 8,175,539 relates to a method of performing communication while minimizing mutual interference in a sharing band. In other words, in the technology disclosed in U.S. Pat. No. 8,175,539, in order to minimize interference in a sharing band, each communication entity continuously monitors a channel, and performs communication using another channel or method if a signal that may collide with its own signal is detected.

The technology disclosed in U.S. Pat. No. 8,175,539 does not have a solution to an unknown signal because a signal is determined based on only some analog information. Furthermore, in the technology disclosed in U.S. Pat. No. 8,175,539, a signal is not detected, but rather an interference signal is avoided. To this end, the main objective of the technology disclosed in U.S. Pat. No. 8,175,539 is to classify signals in order to select a band through which an interference signal can be avoided when the interference signal is detected.

As another conventional art, U.S. Pat. No. 8,050,413 discloses a system and method for conditioning a signal received at an MEMS-based acquisition device. The technology disclosed in U.S. Pat. No. 8,050,413 relates to the detection of events for an unmanned security sensor. In a method of recording and observing an environment in a security system, information about the environment has to be obtained in order to record the environment and detect an intrusion efficiently, because a high memory capacity is required to record the environments continuously. To this end, the technology disclosed in U.S. Pat. No. 8,050,413 proposes the detection of signals corresponding to a sound band and a visible ray band in order to obtain environment information. If energy is detected in one or more bands when a sound band is detected, it is determined that an event has occurred. If light that is higher than a specific luminous intensity is detected in the corresponding environment, it is determined that an event has occurred. When this event occurs, the security sensor performs the operation of recording images and video of a surrounding environment at the same time. A detection band is extended in order to effectively ensure an event, and a bandwidth of 100 KHz or higher that is much higher than the audible range is observed using an MEMS-based sensor in order to extend the detection band. The characteristics of a signal detected in this bandwidth are classified based on frequency bands, and an event is generated based on the classified characteristics.

In the technology disclosed in U.S. Pat. No. 8,050,413, the security sensor capable of detecting a sound and light is configured and mounted in an MEMS form. Furthermore, when a sound or light is detected, a band in which a sound or light has been detected is determined and, a security detector is operated. Whether an event is present is determined based on whether a sound or light is present.

SUMMARY OF THE INVENTION

Accordingly, the present invention has been made keeping in mind the above problems occurring in the prior art, and an object of the present invention is to provide an apparatus and method for detecting signals, which, effectively analyze and track an unwanted signal or an abnormal signal that is different from a normal signal.

In accordance with an aspect of the present invention, there is provided a signal detection apparatus, including a signal reception unit configured to receive an external signal; an Analog to Digital (A/D) signal processing unit configured to determine whether the received signal is an abnormal signal based on a plurality of signal profiles having different signal characteristics, and to obtain the abnormal signal if, as a result of the determination, it is determined that the received signal is the abnormal signal; and a user interface unit configured to display the abnormal signal.

The signal reception unit may include one or more of a single omnidirectional antenna, a single directional antenna, two or more directional antennas, two or more omnidirectional antennas, and a wired probe.

The signal reception unit may include an electronic compass or a gyro module configured to determine a direction and posture of the signal reception unit.

Each of the plurality of signal profiles may include information about a basic structure of a signal, a characteristic of a source signal based on signal demodulation, and pattern matching based on bit extraction.

The information about the basic structure of the signal may include information about a geographical location, start, center and end frequencies, bandwidth, spectral shape, and time domain pattern of the signal, and signal characteristics when the signal is generated and terminated.

The A/D signal processing unit may include a signal conversion unit configured to convert a signal sample, obtained by digitally converting the signal received by the signal reception unit, into a digital signal in a time domain and a digital signal in a frequency domain; a profile matching unit configured to determine whether an output signal of the signal conversion unit is an abnormal signal depending on whether the output signal matches any of plurality of signal profiles having the different signal characteristics; and a signal acquisition unit configured to obtain the abnormal signal from the output signal of the signal conversion unit.

The profile matching unit may include a signal profile group unit configured to store the plurality of signal profiles having the different signal characteristics; a profile selection unit configured to select one or more from among the plurality of signal profiles; and a matching processing unit configured to determine whether the output signal matches any of the selected signal profiles by comparing the output signal of the signal conversion unit with the signal profiles selected by the profile selection unit in response to the output signal of the signal conversion unit.

The matching processing unit may include an analog processing unit configured to perform analog processing on the output signal of the signal conversion unit; and a first matching unit configured to determine whether a characteristic of the output signal of the analog processing unit matches a characteristic of any of the selected signal profiles by comparing an output signal of the analog processing unit with the signal profiles selected by the profile selection unit.

The matching processing unit may further include a demodulation unit configured to demodulate an output signal of the analog processing unit; and a second matching unit configured to determine whether a characteristic of the output signal of the demodulation unit matches a characteristic of any of the selected signal profiles by comparing an output signal of the demodulation unit with the signal profiles selected by the profile selection unit.

The matching processing unit may further include a bit extraction unit configured to extract a bit pattern from the output signal of the demodulation unit; and a third matching unit configured to determine whether a characteristic of the output signal of the bit extraction unit matches a characteristic of any of the selected signal profiles by comparing an output signal of the bit extraction unit with the signal profiles selected by the profile selection unit.

The signal acquisition unit may include a sample buffer configured to store the output signal of the signal conversion unit for a specific interval, and to output the stored signal; and a trigger processing unit configured to trigger the signal stored in the sample buffer, and to output the stored signal if the output signal of the signal conversion unit is an abnormal signal.

The trigger processing unit may check whether the output signal of the signal conversion unit is present at a specific frequency, and trigger the signal stored in the sample buffer based on the results of the checking.

The trigger processing unit may trigger the signal stored in the sample buffer if the output signal of the signal conversion unit has a state different from a normal signal state for a predetermined detection band based on the normal signal state.

The trigger processing unit may trigger the signal stored in the sample buffer if the output signal of the signal conversion unit is an abnormal signal based on a normal signal state for a predetermined detection band and a list of previously stored abnormal signal profiles.

The user interface unit may include a sample buffer configured to synchronize an output signal of the A/D signal processing unit with information about a direction of the signal reception unit and information about an image of a camera in the direction of the signal reception unit, to store the output signal and information for a specific interval, and to output the stored output signal and information; a signal processing unit configured to convert the output signal of the sample buffer into a signal to be shown to a user; and a display unit configured to display the signal of the signal processing unit on a screen, and to display a spatial spectrogram based on the direction information on the screen.

The first of two axes of the spatial spectrogram represents frequency, and the second axis represents direction.

The signal processing unit may cause the spatial spectrogram based on the direction information, specifically a spatial spectrogram corresponding to the camera image information, to be displayed on the display unit.

The signal processing unit may cause the spatial spectrogram based on the direction information, specifically the camera image information corresponding to a selected spatial spectrogram, to be displayed on the display unit.

In accordance with an aspect of the present invention, there is provided a signal detection method, including receiving, by a signal reception unit, an external signal; determining, by an Analog to Digital (A/D) signal processing unit, whether the received signal is an abnormal signal based on a plurality of signal profiles having different signal characteristics; obtaining, by the A/D signal processing unit, the abnormal signal if, as a result of the determination, it is determined that the received signal is the abnormal signal; and displaying, by a user interface unit, the abnormal signal.

Determining whether the received signal is an abnormal signal may include converting a signal, sample, obtained by digitally converting the received signal, into a digital signal in the time domain and a digital signal in the frequency domain; and determining whether the converted signal is an abnormal signal depending on whether the converted signal matches any of the plurality of signal profiles having the different signal characteristics.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
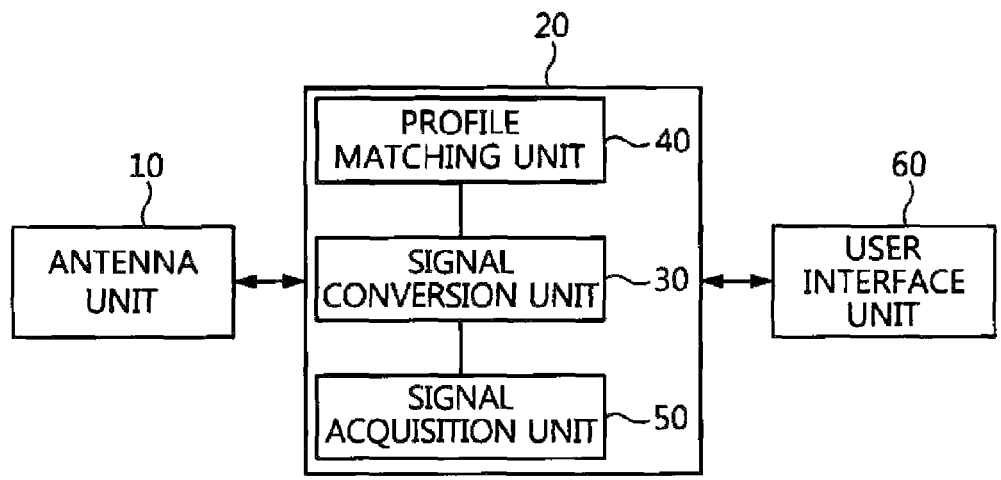
FIG. 1 shows the construction of a signal detection apparatus according to an embodiment of the present invention.

The present invention includes an antenna structure and/or a probe structure for obtaining electromagnetic waves in various manners, and includes the steps of converting an analog signal into a digital signal, performing various types of digital signal processing in order to analyze the characteristics of the digital signal, and displaying the results of the processing to a user, and performing post-processing. This enables the present invention to have the function of detecting an abnormal signal, performing the physical/characteristic/informative analysis of the corresponding signal, displaying information about the signal to a user, and storing the information.

Fields that are similar to that of the present invention include fields in which an oscilloscope, a spectrum analyzer, a signal analyzer, and a signal detector are used. The oscilloscope is commonly used to display a signal in the time domain and in a set bandwidth without change and to analyze the type of signal in the time domain. The spectrum analyzer functions to collect signals based on a set observation band and to display information about the spectra of the signals to a user. The spectrum analyzer is commonly used to check the characteristics of a signal in the frequency domain. An improved version of the spectrum analyzer is a signal analyzer. The signal analyzer functions to check a signal in the time/frequency domains, to analyze the signal according using some predetermined methods, and to display the analyzed signal or allow a user to listen to the analyzed signal. Unlike the signal detector and, conventional equipment for performing a command given by a user, the signal detector provides an interface for estimating the type of signal source based on a specific condition and analyzing an abnormal signal. The present invention pertains to the category of a signal detector, and the present invention focuses on a scheme for improving a conventional signal detector having limited performance.

A signal detection apparatus according to embodiments of the present invention will be described with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the examples at the time at which the present application is filed.

FIG. 1 shows the construction of a signal detection apparatus according to an embodiment of the present invention.

The signal detection apparatus of FIG. 1 includes an antenna unit 10, an Analog/Digital (A/D) signal processing unit 20, and a user interface unit 60.

The antenna unit 10 receives an external wireless signal (e.g., a broadband frequency signal). The antenna unit 10 includes one or more of a single omnidirectional antenna, a single directional antenna, two or more directional antennas, and two or more omnidirectional antennas.

In other words, the antenna unit 10 may include a single omnidirectional antenna, but may include a directional antenna for detecting a direction or an antenna using an antenna arrangement. In this case, the direction of the antenna may be estimated based on a measurement module, such as an electronic compass or a gyrocompass. Alternatively, the antenna unit 10 may be configured to estimate the direction of a signal using the direction of a beam configuration having an antenna arrangement with the aid of the measurement module. Furthermore, in order to estimate a location, a plurality of the antennas may be arranged to be spaced apart from one another at specific intervals or may be disposed in a structure having a geometrical shape. Furthermore, if signals are received from one or more antennas, one or more A/D signal processing units 20 may be used. Here, if one A/D signal processing unit 20 is used, a circuit for antenna switching is included. This circuit may be implemented to be synchronized with a clock input to an Analog To Digital Converter (ADC) at a signal processing stage. In order to input a signal, a wired probe for extracting a wired signal may be used as an input device instead of the antenna unit 10. In this case, the signal of the wired probe is received using a device other than the antenna unit 10. The antenna unit 10 is an example of a signal reception unit that is described in the claims of the present invention.

Meanwhile, it will be apparent that a microphone may be used instead of the antenna(s). In this case, all the following descriptions of a method of detecting an abnormal signal, a method of obtaining a signal, and a method of displaying a signal that are presented by the present invention may be applied to the microphone by replacing the antenna(s) with the microphone and using a voice band circuit for processing an audio signal instead of an RF circuit for detecting a wireless signal. For example, if a microphone is used instead of the antenna(s), the microphone may include one or more microphones having a directional characteristic for estimating a direction or a combination of a microphone without directivity and a microphone with directivity. The microphones may be physically spaced apart from each other at a specific interval. Furthermore, a method of using microphones may be divided into a method of using one microphone at one point of time and a method of using two or more microphones at one point of time. If only one of a plurality of microphones is used at one point of time, the respective microphones may transfer received signals to the A/D signal processing unit 20 using a specific time division method.

The A/D signal processing unit 20 determines whether a signal received by the antenna unit 10 is an abnormal signal based on a plurality of signal profiles having different signal characteristics (also called features). If, as a result of the determination, it is determined that the received signal is an abnormal signal, the A/D signal processing unit 20 obtains the abnormal signal. To this end, the A/D signal processing unit 20 includes a signal conversion unit 30 for converting a signal sample, obtained by converting the analog signal received by the antenna unit 10 into the digital signal, into a digital signal in the time domain and a digital signal in the frequency domain; a profile matching unit 40 for determining whether the output signal of the signal conversion unit 30 is an abnormal signal depending on whether the output signal of the signal conversion unit 30 matches one of a plurality of signal profiles having different signal characteristics (also called features); and a signal acquisition unit 50 for obtaining the abnormal signal from the output signal of the signal conversion unit 30.

The A/D signal processing unit 20 may include various modules, such as a gain block, a mixer block, a filter block, and a clock block, in order to convert an RF signal (i.e., an analog signal) received by the antenna unit 10 into a digital signal. The signal sample digitally converted by the A/D signal processing unit 20 may undergo, a signal processing step in the time/frequency domains. The signal processing step may include the step of simply performing signal conversion from the time domain to the frequency domain, or the step of extracting video, audio and/or information bits from the signal sample in the time domain according to a specific signal format. Furthermore, likewise, video, audio and/or information bits may be extracted from the digitally converted signal in the frequency domain. If an abnormal signal is detected, the A/D signal processing unit 20 may further include a trigger block, for catching the abnormal signal. The signal sample may be stored in internal memory in a sample form in the time/frequency domains. Furthermore, signal samples processed by the A/D signal processing unit 20 and the current direction of the antenna may be processed so that they are associated with each other, or may be processed in association with a device, such as a camera.

The A/D signal processing unit 20 operates under the control of the user interface unit 60, and may have high-speed and low-speed mode operations. Furthermore, the A/D signal processing unit 20 may be configured to obtain a signal according to a specific signal condition, and may transfer the obtained signal to the user interface unit 60 in real time, or store the obtained signal in internal memory and then send the stored signal. Furthermore, the A/D signal processing unit 20 may demodulate and/or reconstruct a received signal in real time based on a specific signal profile designated by a user.

The user interface unit 60 displays not only the characteristic of the abnormal signal obtained by the A/D signal processing unit 20, but also the general characteristics of, the received signal on a screen.

The user interface unit 60 provides a user with a basic interface capable of controlling the signal detection apparatus, and may classify a signal now being detected and analyzed, estimate the location of the signal, and control the demodulation of the corresponding signal and the transmission of disrupting waves.

The user interface unit 60 may display not only representations of signals (i.e., including an abnormal signal and all received signals) in the time/frequency domains, but also the time or direction spectrograms of the signals, and may include a function of displaying the distribution or directions of abnormal signals on a map. In other words, the user interface unit 60 functions to present time/frequency samples, video, audio and/or information bits, or information about the results of detected abnormal signals to a user.

The user interface unit 60 may set several detection criteria in order to detect an abnormal signal. The detection criteria may be based on a method of using a signal classification list for each area, frequency, and bandwidth previously set by a user, or a method of classifying signals based on the characteristics of the signals and the demodulation results of the signals based on the characteristic profiles of the signals. The classification operation may be fully processed by the user interface unit 60, or the classification operation may be performed through the calculation of the A/D signal processing unit 20 and the user interface unit 60 may use the results of the calculation.

Figure 2:
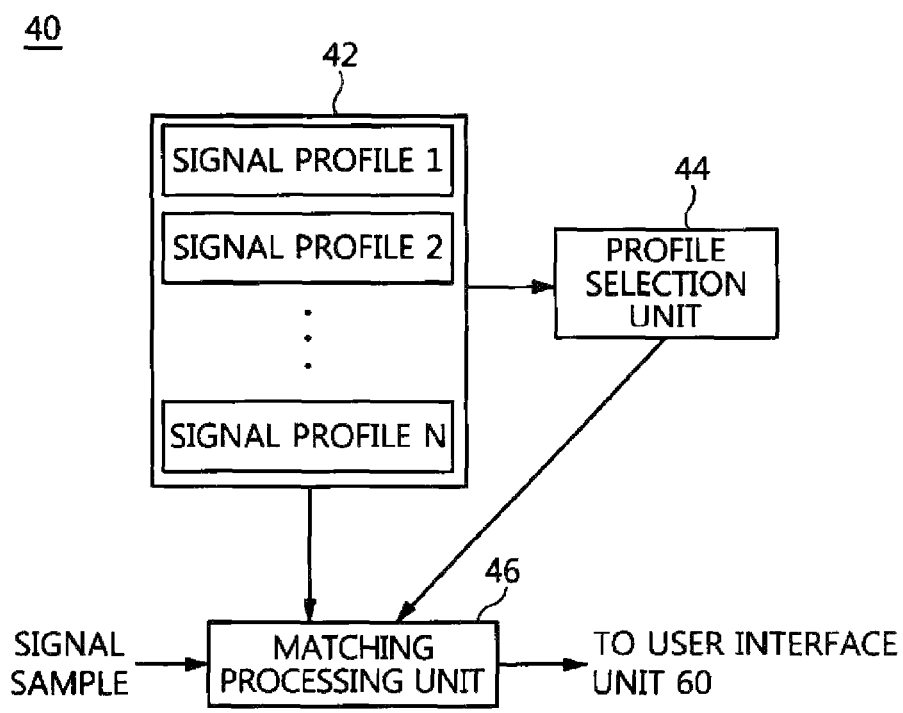
FIG. 2 shows the internal construction of a profile matching, unit shown in FIG. 1.

FIG. 2 shows the internal construction of the profile matching unit 40 shown in FIG. 1.

The profile matching unit 40 includes a signal profile group unit 42, a profile selection unit 44, and a matching processing unit 46.

The signal profile group unit 42 stores a plurality of signal profiles (e.g., signal profile 1 to signal profile N) having different signal characteristics. Here, each of the plurality of signal profiles includes information about the basic structure of a corresponding signal, the characteristics of a source signal based on signal demodulation, and pattern matching based on bit extraction. Furthermore, the information about the basic structure of a signal may include information about the geographical location, center frequency, start frequency, end frequency, bandwidth, spectral shape, and time domain pattern of the signal, and signal characteristics when the signal is generated and terminated.

The profile selection unit 44 selects one or more signal profiles from the plurality of signal profiles stored in the signal profile group unit 42. The profile selection unit 44 sequentially selects a plurality of signal profiles and notifies the matching processing unit 46 of the selected signal profiles. If a user designates only some of the plurality of signal profiles, the profile selection unit 44 selects the designated signal profiles and notifies the matching processing unit 46 of the selected signal profiles.

When an output signal (i.e., a signal sample in the frequency/time domains) is received from the signal conversion unit 30, the matching processing unit 46 determines whether the output signal matches the signal profile by comparing the output signal with the signal profiles selected by the profile selection unit 44.

FIG. 2 shows the structure of the basic concept of detecting an abnormal signal, in which an abnormal signal is detected by the profile matching unit 40.

The simplest method of detecting an abnormal signal is to classify a signal based on information about its frequency and bandwidth and simply determine whether the classified signal is located at a permitted signal location. If a non-permitted signal overlaps a permitted signal, it is impossible to detect an abnormal signal. In order to solve this problem, in an embodiment of the present invention, an abnormal signal is determined based on signal profiles, each including the spectral shape, modulation scheme, symbol rate, pattern based on demodulation, time domain transmission/reception patterns, and bit-based signal pattern of a signal (e.g., a normal signal (i.e., permitted signal)).

The profile matching unit 40 may determine the structure of an abnormal signal or a permitted signal based on the signal profile group unit 42 in which the signal profiles have been stored, and may determine whether a received signal is an abnormal signal depending on whether the abnormal signal or the permitted signal matches the signal profile. Furthermore, the profile matching unit 40 may display the results to a user.

For example, if a signal sample (i.e., a digital signal sample in, the frequency/time domains) matches a signal profile that is classified as being an abnormal signal, the profile matching unit 40 may determine the signal sample as an abnormal signal. If there is not a matching, profile that is classified as being an abnormal signal as described above, the profile matching unit 40 displays information (e.g., the characteristics of the signal or information about a transmission/reception system, and a device name) about the abnormal signal via the user interface unit 60.

Furthermore, if a signal sample (i.e., a digital signal sample in the frequency/time domains) does not match any of all the signal profiles, the profile matching unit 40 may determine the signal sample to be an abnormal signal. If there is no matching signal profile and thus information about the signal sample is not present, the profile matching unit 40 determines that the signal sample corresponds to an abnormal signal and provides notification of the abnormal signal without detailed information.

Furthermore, if necessary, the profile matching unit 40 may estimate the similarity to each signal profile through the analysis of each signal profile of the signal profile group unit 42, and may output a specific number of higher ranking signal profiles to a user based on the estimated similarity.

Meanwhile, if it is difficult to previously define a permitted signal (or a normal signal), the profile matching unit 40 may detect an abnormal signal based on a specific frequency spectral shape that is permitted by a user. That is, the profile matching unit 40 may detect an abnormal signal by performing analysis/comparison on the details of signals that will be generated in the future based on a snap shot of a specific spectrum (e.g., instantaneous, mean, and highest values) defined by a user. In this case, in order to reduce the number of unnecessary manipulations of a user, a method of automatically recording changes in operation based on the spectrum during a specific time, integrating the details of signals generated during the specific time, and using the integrated details as a reference during the next observation time may be used. In this case, in order to detect the activity of signals, a method of detecting all signals that are newly generated and terminated in each time interval is used.

Furthermore, a method of detecting an abnormal signal may include a method of detecting the generation of a signal other than signals that are designated by a user and a method of detecting the termination or deformation of some of the signals that are designated by a user. If a signal other than the designated signal is generated, it means that electric waves are newly generated and thus new electromagnetic equipment operates or a specific electronic circuit starts to operate. Furthermore, if a signal is terminated or deformed, it may mean that the signal is generated intermittently without being continuous, the signal will never appear again, the time/frequency characteristics of the signal have been changed, or additional signal components are included in the signal. In this case, in order to estimate this change, information including a previously permitted signal should be stored in the profile matching unit 40, or a user should check information about a band in which a user desires to observe the change and then the profile matching unit 40 should automatically detect the change based on the arrangement of signals or information about the spectra of signals.

Accordingly, such a signal profile may include the details of changes in signal over time, the characteristics of a signal when the signal is generated and terminated, and correlations with the characteristics of other signals, as well as the simple characteristics of an instantaneous signal.

In other words, in order to analyze whether a received signal is an abnormal signal, a user may provide the characteristics of a signal that may be present in a corresponding band so that whether a corresponding signal standard is fulfilled can be evaluated. That is, analyzing whether a received signal is an abnormal signal is determining whether the received signal has a permitted form (i.e., a normal form) in a corresponding band. Analyzing whether a received signal is an abnormal signal includes the step of comparing the frequency domain parameters of the two signals with each other and the step of performing determination based on the results of analysis of the signals in the time domain.

Another method is to use various types of analysis criteria. If the types of signal that may be present in a specific band are various, it is difficult to conduct a test, such as that described above. If various types of analysis criteria are used, the characteristics of a signal are checked based on the various types of analysis criteria. That is, if the types of signal is not limited or the signal has various types, the step of performing comparison and verification on a signal using analysis profiles (i.e., signal profiles) for a signal source defined in a detection device may be performed. Here, the analysis profiles (i.e., signal profiles) may be viewed as a bundle of lists in which characteristics in the frequency domain and characteristics in the time domain have been defined. A signal detected in the analysis lists is analyzed and then automatically displayed, and a signal not present in the lists may also be classified as an abnormal signal. If it is difficult to designate the characteristic of an abnormal signal, the template sample of the abnormal signal itself may be stored and used to detect a signal in the future.

Figure 3:
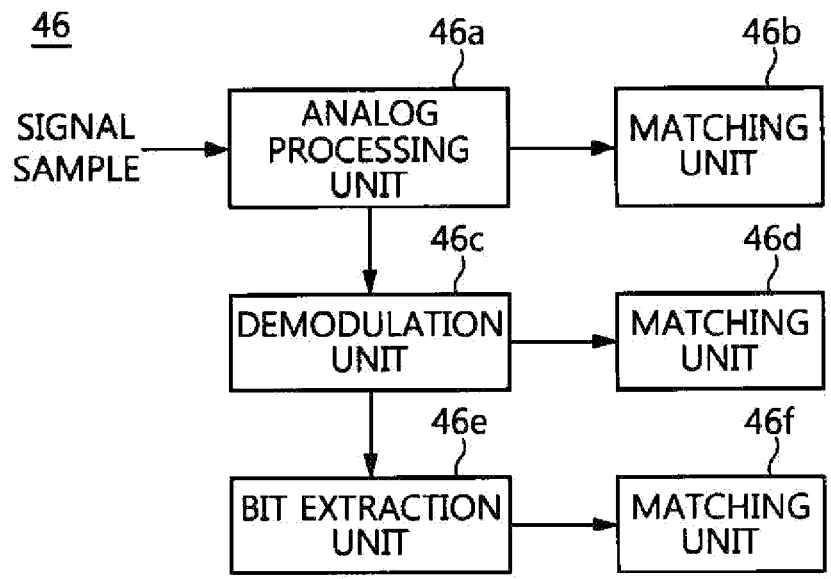
FIG. 3 shows the internal construction of a matching processing unit shown in FIG. 2.

FIG. 3 shows the internal construction of the matching processing unit 46 shown in FIG. 2.

The matching processing unit 46 of FIG. 3 basically includes an analog processing unit 46a and a matching unit 46b. The matching processing unit 46 may further include a demodulation unit 46c and a matching unit 46d. The matching processing unit 46 may further include a bit extraction unit 46e and a matching unit 46f.

The analog processing unit 46a performs analog processing on the output signal (i.e., a digital signal sample in the frequency/time domains) of the signal conversion unit 30. The matching unit 46b determines whether the output signal matches the signal profile by comparing the morphological characteristic (also called feature) of the output signal of the analog processing unit 46a with signal profiles sequentially selected by the profile selection unit 44. The matching unit 46b is an example of a first matching unit that is described in the claims of this application.

The analog processing unit 46a and the matching unit 46b perform matching based on the morphological characteristic (also called "feature") of a signal instead of the analysis of the signal itself. That is, the analog processing unit 46a and the matching unit 46b perform analog processing matching based on signal profiles that are constructed based on the simple structural information of a signal, for example, information about the geographical location, center, start and end frequencies, bandwidth, spectral shape, and time domain pattern of the signal, or signal characteristics when the signal is generated and terminated.

Meanwhile, if a definite match is not obtained by the analog processing unit 46a and the matching unit 46b, the demodulation unit 46c and the matching unit 46d determine whether the signal is an abnormal signal.

The demodulation unit 46c demodulates the output signal of the analog processing unit 46a. The matching unit 46d determines whether the output signal matches the selected signal profile by comparing the characteristic (also called feature) of the output signal of the demodulation unit 46c with a signal profile selected by the profile selection unit 44. The matching unit 46d is an example of a second matching unit that is described in the claims of this application.

In order to clearly check the characteristic of the output signal, the demodulation unit 46c may analyze the characteristic of a source signal again by directly demodulating the source signal. In this case, if the source signal is an analog signal, the demodulation unit 46c may estimate the bandwidth of the source signal and a coherence span in which the characteristic of a signal does not change in the time/frequency domains along with the characteristic (e.g., the irregularity of a signal itself or a specific analog signal format (e.g., DSB, USB, LSB, VSB, or AM/FM) by which a video/audio or another analog signal can be determined. If the source signal is a digital signal, a matching structure using a symbol rate, a modulation scheme (e.g., QAM, PSK, ASK, FSK, OFDM, CDMA, OOK, or OQPSK), a bandwidth, and the signal shape of the source signal in the time/frequency domains as basic parameters may be constructed.

If the demodulation unit 46c and the matching unit 46d are used, analog matching can be performed more reliably even when the analog characteristic of a signal itself does not have a definite match due to the influence of a channel or an overlapping signal or noise.

Furthermore, the bit extraction unit 46e and the matching unit 46f may be used when the already stored characteristic pattern of the digital bits of a specific device or the already stored protocol of the specific device is previously determined.

The bit extraction unit 46e extracts a bit pattern or specific signal structure from the output signal of the demodulation unit 46c. The matching unit 46f determines whether the output matches a signal profile by comparing the output of the bit extraction unit 46e with the signal profile selected by the profile selection unit 44. The matching unit 46f is an example of a third matching unit that is described in the claims of this application.

In the case of a digital signal, the bit extraction unit 46e and the matching unit 46f may determine whether a signal has an exact match by searching for a specific bit pattern (or bit pattern) or a specific signal structure (e.g., a preamble signal, a pilot signal, or a specific signal marker). In this case, the pattern of the bits or the periodicity or frequency of occurrence of the signal structure may also be taken into consideration.

After matching related to the abnormal signal has been completed by the matching processing unit 46, it is preferred that information about a corresponding transmitter be displayed along with a corresponding signal. Alternatively, if there is no exact match, both a signal profile and not matched information or only matched characteristics may be displayed.

Figure 4:
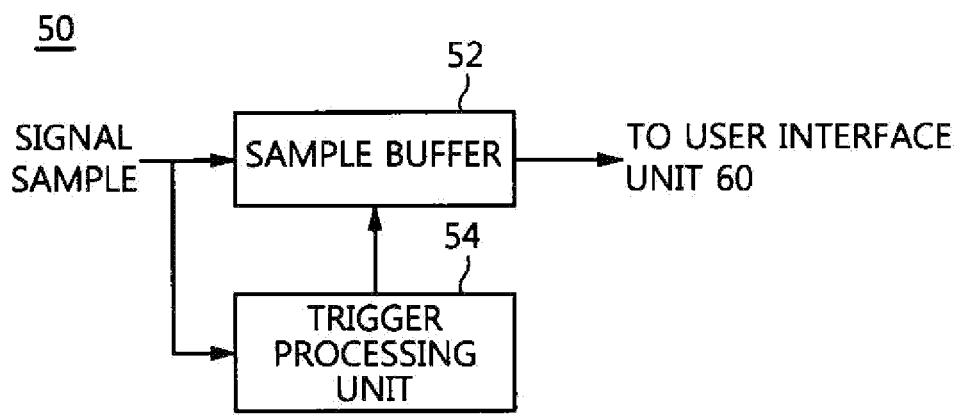
FIG. 4 shows the internal construction of a signal acquisition unit shown in FIG. 1.

FIG. 4 shows the internal construction of the signal acquisition unit 50 shown in FIG. 1. The internal construction corresponds to a basic structure in which the signal acquisition unit 50 obtains a signal in response to a trigger when an abnormal signal is detected by the profile matching of the matching processing unit 46.

In a conventional method, a signal is obtained based on the magnitude of the signal in the time domain or the transition type of the signal. This method is available when only a specific signal is present in a corresponding band under observation. As a representative example, in the case of an oscilloscope, a criterion for obtaining a signal can be established using only the operation in the time domain because only a desired signal is selected by a probe and checked.

Unlike the conventional method, the present invention proposes a method of obtaining a signal when several signals are mixed, not when only a specific signal is present. In order to classify and observe a specific signal when several signals are mixed, a method of extracting a signal from the several signals using a filter matching a specific frequency and generating a trigger in the time domain from the extracted signal may be used. In this case, the signal may be obtained by generating the trigger using a tunable filter or while varying a filter digitally. Since spectrum information is extracted by the A/D signal processing unit 20 in practice, a signal may be obtained depending on whether the signal is present at a corresponding location if the signal is observed at one or more specific frequency locations. That is, if an unexpected abnormal signal is detected at some frequencies in the state in which mixed signals are present at different frequency locations, the settings of hardware are controlled such that the corresponding signal can be sampled and samples are stored in a sample buffer 52. Here, the trigger information from the trigger processing unit 54 may be generated from signal processing hardware to achieve a fast response time. If a slow response time is not problematic, the user interface unit 60 may automatically generate and provide the trigger information.

If a frequency location where a signal will be observed and obtained is already known as described above, it is easy to perform the operation of setting the selection of the signal at one or more corresponding frequency locations and detecting and obtaining signals at the frequency locations. In contrast, in the case of an abnormal signal, it is difficult to expect the characteristic of the abnormal signal because the abnormal signal is generated at a location that cannot be expected by a user or the abnormal signal assumes a form different from an existing form that is known to a user. Accordingly, if a signal is obtained and a trigger is defined based on an already known location, the probability that an abnormal signal is detected may be lowered. In order to avoid this problem, information about the normal state of a frequency in a specific detection band may be stored, and an abnormal signal may be obtained when the abnormal signal is detected using the above-described abnormal signal detection method. That is, the signal acquisition unit 50 sets a change in signal at an unexpected frequency location or a change in normal signal as a detection criterion, and uses the detection criterion as a signal trigger. Here, in order to detect a signal efficiently, the signal acquisition unit 50 may use a method of continuously storing signal samples for a specific interval. If signal samples are stored for a specific time, the desired location of a signal attributable to the inaccurate location of a trigger, a delay resulting from a digital signal detection algorithm, or an interface delay can be prevented from being missed.

The abnormal signal obtained by the signal acquisition unit 50 may be transmitted in response to a request from a user. That is, a signal is retransmitted in order to disrupt a device for receiving the abnormal signal or a transmitter for generating the abnormal signal. Here, the user may set the section of the abnormal signal in accordance with the signal and a transmission pattern via the user interface unit 60. For example, if the signal and the abnormal signal operate in a query and response relationship, detection equipment may classify the signals into two types, and, when all query signals are terminated, send one or more obtained response signals or send one or more query signals that are obtained after all query signals have been terminated, thereby being able to neutralizing the protocol between the signals. Here, a trigger is required to send the obtained signals. An available trigger may be similar to a trigger that has been used to obtain the signals. That is, the trigger used to obtain the signals is stored upon the occurrence of an abnormal signal, and the transmission of a disrupting signal is performed upon the termination of the abnormal signal. Accordingly, in, the foregoing signal acquisition, the generation and termination of the abnormal signal may be used as trigger signals of the signal acquisition unit 50.

In greater detail, the signal acquisition unit 50 may include the sample buffer 52 and a trigger processing unit 54.

The sample buffer 52 stores the output signal (i.e., digital signal samples in the frequency/time domains) of the signal conversion unit 30 for a specific interval, and outputs the stored output signal. The trigger processing unit 54 triggers the output signal stored in the sample buffer 52 if the output signal (i.e., digital signal samples in the frequency/time domains) of the signal conversion unit 30 is an abnormal signal so that the stored signal is output.

The trigger processing unit 54 checks whether the output signal (i.e., digital signal samples in the frequency/time domains) of the signal conversion unit 30 is present at a specific frequency, generates a trigger signal if, as a result of the check, the output signal is not present, and sends the trigger signal to the sample buffer 52. Alternatively, if the output signal (i.e., digital signal samples in the frequency/time domains) of the signal conversion unit 30 has a state different from a normal signal state in a predetermined detection band based on the normal signal state, the trigger processing unit 54 may generate a trigger signal and send the trigger signal to the sample buffer 52. Alternatively, if the output signal (i.e., digital signal samples in the frequency/time domains) of the signal conversion unit 30 is an abnormal signal based on a normal signal state for a predetermined detection band and a list of previously stored abnormal signal profiles, the trigger processing unit 54 may generate a trigger signal and send the trigger signal to the sample buffer 52. The sample buffer 52 outputs a stored signal in response to the trigger signal.

Figure 5:
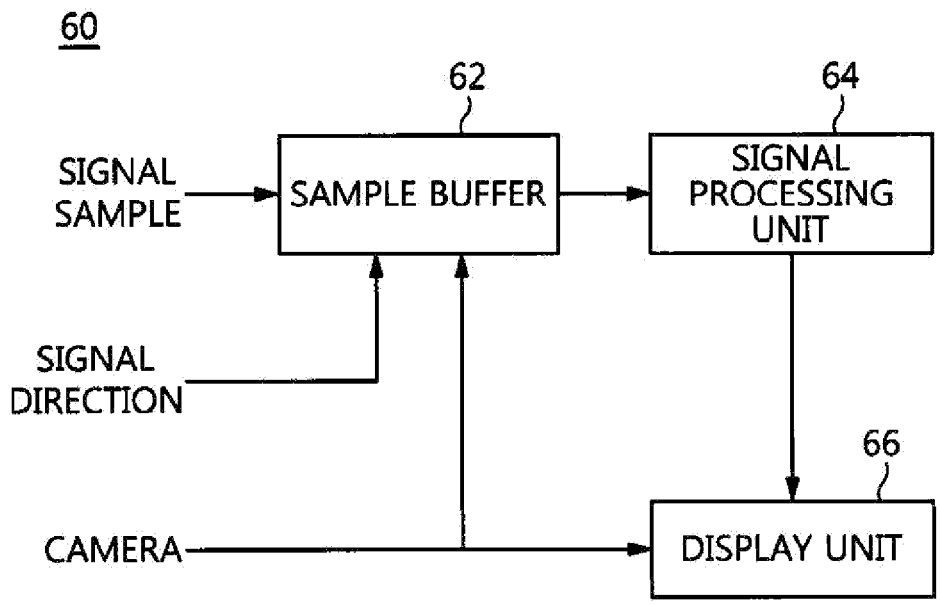
FIG. 5 shows the internal construction of a user interface unit shown in FIG. 1.

FIG. 5 shows the internal construction of the user interface unit 60 shown in FIG. 1. The user interface unit 60 determines the direction of a signal, and displays the determined direction to a user.

If an antenna is directed toward a specific direction, a method of determining the direction of the antenna may utilize an electronic compass or a gyro module using a geomagnetic field. Alternatively, the direction of an antenna may be defined based on the difference between the locations of antennas using a GPS. Accordingly, one or more of an electronic compass and a gyro module for determining the direction and posture of an antenna are installed in one or more antennas of the antenna unit 10.

The direction of a signal sample may be associated with the direction of a signal, or the direction of an antenna may be associated with a received signal sample using a camera based on the measured direction. In this case, display is performed based on the relative direction of the antenna rather than the absolute direction thereof, and a spectrum may be displayed in synchronization with an image that is captured by the camera. When the spectrum is displayed, the spectrum may be displayed in association with the direction (e.g., an absolute direction or a relative direction) of the antenna. As an example, the horizontal axis may be defined as the angle, and the vertical axis may be defined as the frequency. The magnitude of a signal may be represented in the form of, for example, color or a three-dimensional (3D) diagram.

In greater detail, the user interface unit 60 may include a sample buffer 62, a signal processing unit 64, and a display unit 66.

The sample buffer 62 synchronizes information about the directions of one or more antenna of the antenna unit 10 and information about images of the one or more antennas that are captured by cameras with the output signal (i.e., digital signal samples in the frequency/time domains) of the A/D signal processing unit 20, stores the information and signal for a specific interval, and outputs them. The signal processing unit 64 converts the output signal of the sample buffer 62 into a signal to be displayed to a user. The display unit 66 displays the signal of the signal processing unit 64, specifically a spatial spectrogram based on the direction information, on a screen.

The signal processing unit 64 displays the spatial spectrogram based on the direction information through the display unit 66, but may display a spatial spectrogram corresponding to the information about a camera image via the display unit 66. Alternatively, the signal processing unit 64 displays the spatial spectrogram based on the direction information, specifically the information about a camera image corresponding to a selected spatial spectrogram, via the display unit 66.

Figure 6:
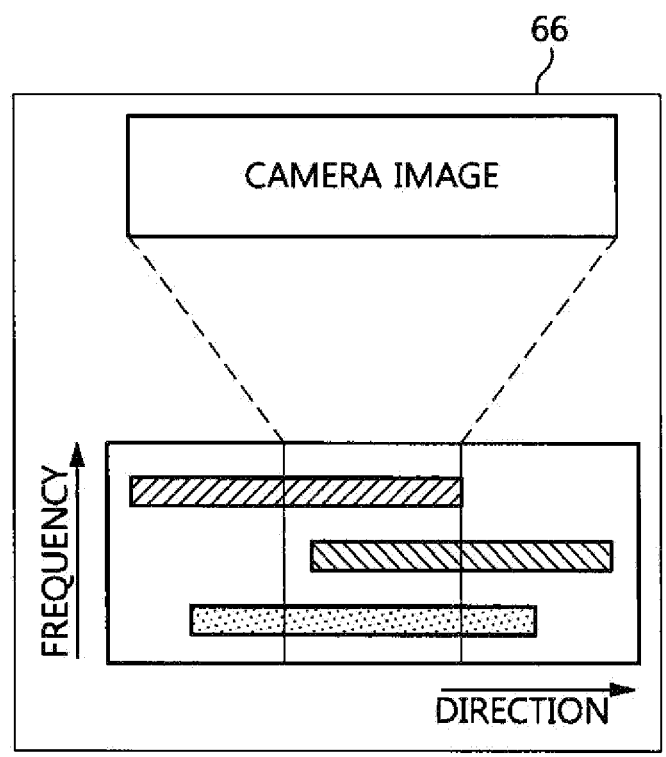
FIG. 6 is a diagram showing an example of a spectrum that is combined with a camera image displayed on a display unit shown in FIG. 5.

FIG. 6 is a diagram showing an example of a spectrum that is combined with a camera image displayed on the display unit 66 shown in FIG. 5.

When a camera image shows a specific direction, the display unit 66 displays that an angle displayed on the camera image is associated with the corresponding region of a spectrum. If a specific direction is shown as described above, there is an advantage in that the part of a camera image that has the greatest intensity of a signal can be visually determined.

In FIG. 6, the horizontal axis of the spectrogram may have an absolute/relative angular indication. That is, if a user attempts to determine a location at his or her location based on the relative location, the location may be displayed based on the user rather than an absolute direction, or the location may be displayed based on the direction of a camera or equipment. Accordingly, if the display of a spectrum based on a direction is performed, an absolute direction value or a relative direction value may be used.

Information about the above-described signal may be converted into characteristics, such as the intensity, bandwidth, and direction of the signal, and displayed on a map, or may be displayed on blank paper based on the relative location. That is, with respect to one or more specific signal components selected by a user, signal characteristics (e.g., signal intensity, a direction, a modulation scheme, an SNR, noise intensity, and a time characteristic) appearing in a observation region may be displayed on a map in the form of color or 3D graphs. Here, a location in each electromagnetic wave measurement may be obtained based on information obtained by a GPS. Alternatively, if the number of antennas that can be handled increases and a location can be estimated based on the antennas, the estimated location of a received signal may be displayed on a map, or a location relative to a detector may be displayed and provided to a user.

Figure 7:
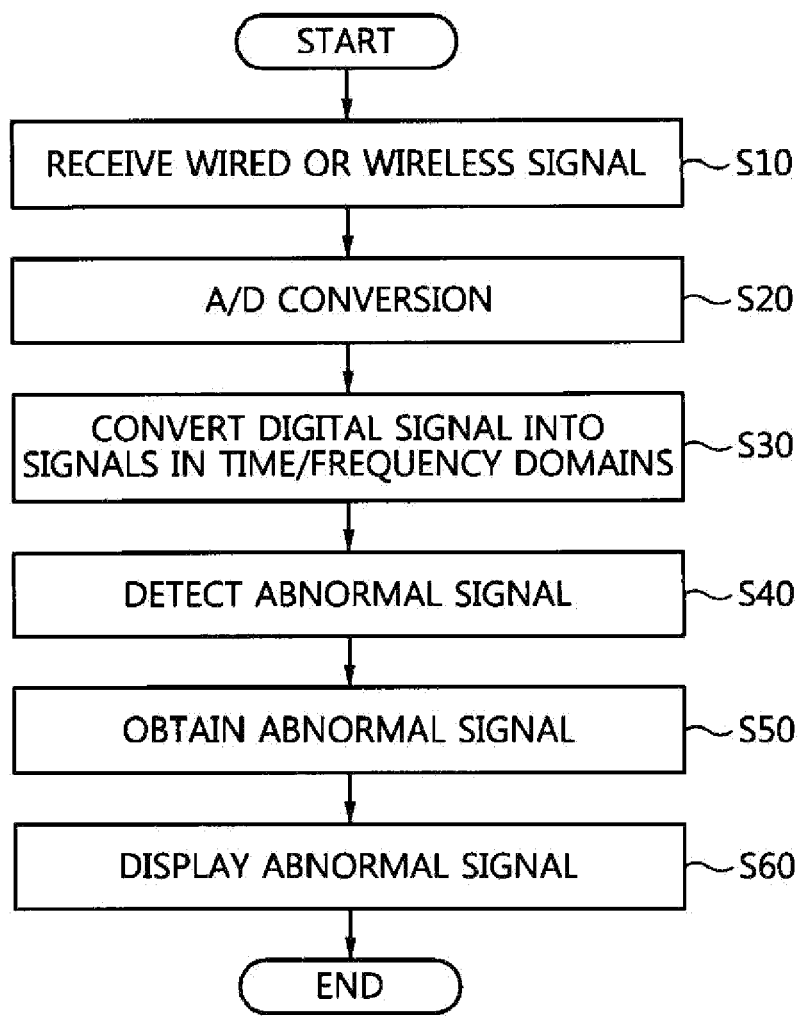
FIG. 7 is a flowchart illustrating the operation of the signal detection apparatus according to an embodiment of the present invention.

FIG. 7 is a flowchart illustrating the operation of the signal detection apparatus according to an embodiment of the present invention.

First, the one or more antennas of the antenna unit 10 receive a wired or wireless signal (e.g., a broadband frequency signal) at step S10. The analog signal received by the antenna unit 10 is transmitted to the A/D signal processing unit 20.

The A/D signal processing unit 20 converts the received analog signal into a digital signal at step S20, and converts the digital signal into a signal in the time domain and a signal in the frequency domain at step S30.

Furthermore, the A/D signal processing unit 20 determines whether the signal in the time domain and the signal in the frequency domain (called signal samples in an embodiment of the present invention) are abnormal signals based on a plurality of signal profiles (e.g., signal profile 1 to signal profile N) having different signal characteristics and detects an abnormal signal based on the results of the determination at step S40. For example, the A/D signal processing unit 20 determines the signal in the time domain and the signal in the frequency domain as abnormal signals if each of the signal in the time domain and the signal in the frequency domain matches a profile that is classified as being an abnormal signal or does not match a given signal profile group.

After an abnormal signal is detected as described above, the A/D signal processing unit 20 generates a trigger signal for obtaining a signal at a point of time at which the abnormal signal was detected and obtains an abnormal signal for the signal at step S50.

Thereafter, the A/D signal processing unit 20 sends the obtained abnormal signal to the user interface unit 60. The user interface unit 60 displays the abnormal signal on a screen, but displays a spatial spectrogram (see FIG. 6) based on direction information on a screen at step S60.

While the detection of an abnormal signal from a wireless signal using an antenna or an electromagnetic probe has been described from a viewpoint in which electromagnetic waves are detected as an example in, the above-described embodiments of the present invention, it will be apparent that the operations, such as the analysis of the characteristic of a signal, the demodulation of a signal, the tracking of the location of a signal, and the transmission of a disrupting signal, can be implemented using a microphone instead of the antenna.

As described above, the apparatus and method of the present invention are advantageous in that an abnormal signal is detected based on profiles designated by a user, so that an abnormal signal can be precisely detected compared to conventional matching using simple frequency/bandwidth search and the type of transmitter can also be determined.

Furthermore, the apparatus and method of the present invention are advantageous in that there is an advantage from the viewpoint of signal, acquisition in that the present invention can be easily applied to unmanned operation via a function of obtaining and storing only a precisely determined signal without wasting resources because of the collection of unnecessary signals upon obtaining signals.

Furthermore, the apparatus and method of the present invention are advantageous from the viewpoint of signal analysis in that a corresponding signal is obtained by detecting the location and direction of a desired signal are detected and the obtained signal is retransmitted at a specific time location, so that a disrupting signal that hinders the integrity of a signal itself can be transmitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal detection apparatus comprising:
   at least one hardware processor executing instructions for performing the following:
   a signal receiver receiving an external signal;
   an Analog to Digital (A/D) signal processor determining whether the received signal is an abnormal signal based on a plurality of signal profiles having different signal characteristics, and obtaining the abnormal signal if, as a result of the determination, it is determined that the received signal is the abnormal signal; and
   a user interface displaying the abnormal signal,
   wherein the A/D signal processor comprises:
   a signal converter converting a signal sample, obtained by digitally converting the signal received by the signal receiver, into a digital signal in a time domain and a digital signal in a frequency domain;
   a profile matcher determining whether an output signal of the signal converter is an abnormal signal depending on whether the output signal matches any of plurality of signal profiles having the different signal characteristics; and
   a signal acquisitor obtaining the abnormal signal from the output signal of the signal converter,
   wherein the profile matcher comprises:
   a signal profile group storing the plurality of signal profiles having the different signal characteristics;
   a profile selector selecting one or more from among the plurality of signal profiles; and
   a matching processor determining whether the output signal matches any of the selected signal profiles by comparing the output signal of the signal converter with the signal profiles selected by the profile selector in response to the output signal of the signal converter, and
   wherein the matching processor comprises:
   an analog processor converting the output signal of the signal converter into an analog signal; and
   a first matcher determining whether a characteristic of the output signal of the analog processor matches a characteristic of any of the selected signal profiles by comparing the output signal of the analog processor with the signal profiles selected by the profile selector.

2. The signal detection apparatus of claim 1, wherein the signal receiver includes one or more of a single omnidirectional antenna, a single directional antenna, two or more directional antennas, two or more omnidirectional antennas, and a wired probe.

3. The signal detection apparatus of claim 1, wherein the signal receiver includes an electronic compass or a gyro module configured to determine a direction and posture of the signal receiver.

4. The signal detection apparatus of claim 1, wherein each of the plurality of signal profiles includes information about a basic structure of a signal, information about a characteristic of a source signal based on signal demodulation, and information about pattern matching based on bit extraction.

5. The signal detection apparatus of claim 4, wherein the information about the basic structure of the signal includes information about a geographical location, start, center and end frequencies, bandwidth, spectral shape, and time domain pattern of the signal, and signal characteristics when the signal is generated and terminated.

6. The signal detection apparatus of claim 1, wherein the matching processor further includes:
  a demodulator demodulating the output signal of the analog processor; and
  a second matcher determining whether a characteristic of the output signal of the demodulator matches a characteristic of any of the selected signal profiles by comparing an output signal of the demodulator with the signal profiles selected by the profile selector.

7. The signal detection apparatus of claim 6, wherein the matching processor further includes:
  a bit extractor extracting a bit pattern from the output signal of the demodulator; and
  a third matcher determining whether a characteristic of the output signal of the bit extractor matches a characteristic of any of the selected signal profiles by comparing an output signal of the bit extractor with the signal profiles selected by the profile selector.

8. The signal detection apparatus of claim 1, wherein the signal acquisitor includes:
  a sample buffer storing the output signal of the signal converter for a specific interval, and outputting the stored signal; and
  a trigger processor triggering the signal stored in the sample buffer, and outputting the stored signal if the output signal of the signal converter is an abnormal signal.

9. The signal detection apparatus of claim 8, wherein the trigger processor checks whether the output signal of the signal converter is present at a specific frequency, and triggers the signal stored in the sample buffer based on results of the checking.

10. The signal detection apparatus of claim 8, wherein the trigger processor triggers the signal, stored in the sample buffer if the output signal of the signal converter has a state different from a normal signal state for a predetermined detection band based on the normal signal state.

11. The signal detection apparatus of claim 8, wherein the trigger processor triggers the signal stored, in the sample buffer if the output signal of the signal converter is an abnormal signal based on a normal signal state for a predetermined detection band and a list of previously stored abnormal signal profiles.

12. The signal detection apparatus of claim 1, wherein the user interface includes:
  a sample buffer synchronizing an output signal of the A/D signal processor with information about a direction of the signal receiver and information about an image of a camera in the direction of the signal receiver, storing the output signal and information for a specific interval, and outputting the stored output signal and information;
  a signal processor converting the output signal of the sample buffer into a signal to be shown to a user; and
  a display displaying the signal of the signal processor on a screen, and displaying a spatial spectrogram based on the direction information on the screen.

13. The signal detection apparatus of claim 12, wherein a first of two axes of the spatial spectrogram represents frequency, and a second axis represents direction.

14. The signal detection apparatus of claim 12, wherein the signal processor causes the spatial spectrogram based on the direction information, specifically a spatial spectrogram corresponding to the camera image information, to be displayed on the display.

15. The signal detection apparatus of claim 12, wherein the signal processor causes the spatial spectrogram based on the direction information, specifically the camera image information corresponding to a selected spatial spectrogram, to be displayed on the display.

16. A signal detection method comprising:
  receiving, by a signal receiver, an external signal;
  determining, by an Analog to Digital (A/D) signal processor, whether the received signal is an abnormal signal based on a plurality of signal profiles having different signal characteristics;
  obtaining, by the A/D signal processor, the abnormal signal if, as a result of the determination, it is determined that the received signal is the abnormal signal; and
  displaying, by a user interface, the abnormal signal,
  wherein the determining whether the received signal is an abnormal signal comprises:
  converting a signal sample, obtained by digitally converting the received signal, into a digital signal in a time domain and a digital signal in a frequency domain; and
  determining whether the converted signal is an abnormal signal depending on whether the converted signal matches any of the plurality of signal profiles having the different signal characteristics,
  wherein the determining whether the converted signal is an abnormal signal comprises:
  selecting one or more from among the plurality of signal profiles; and
  determining whether the converted signal matches any of the selected signal profiles by comparing the converted signal with the selected signal profiles, and
  wherein the determining whether the converted signal matches any of the selected signal profiles comprises:
  converting the converted signal into an analog signal; and
  determining whether a characteristic of the analog signal matches a characteristic of any of the selected signal profiles by comparing the analog signal with the selected signal profiles.

* * * * *